Sept. 26, 1961   E. A. ZUZELO   3,001,520
TILTING SAW

Filed Aug. 30, 1960   3 Sheets-Sheet 1

INVENTOR.
EDWARD A. ZUZELO
BY
Charles A. McClure
ATTORNEY.

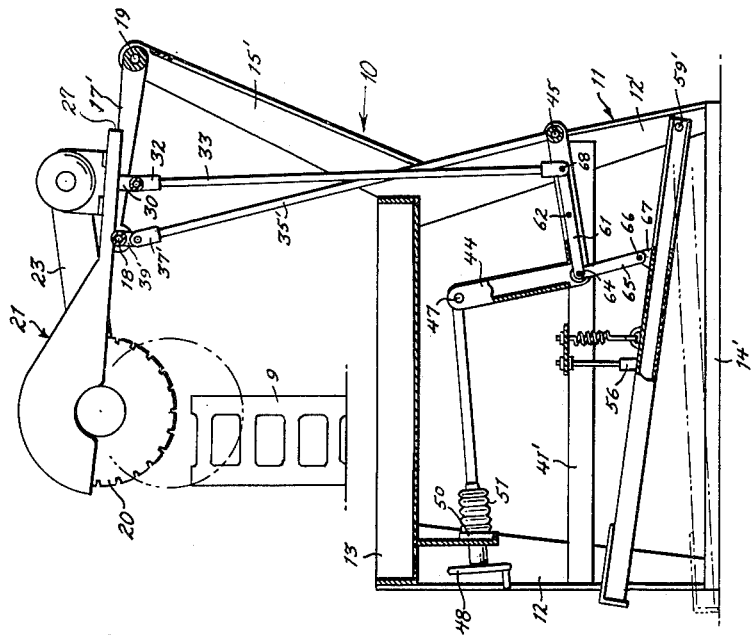

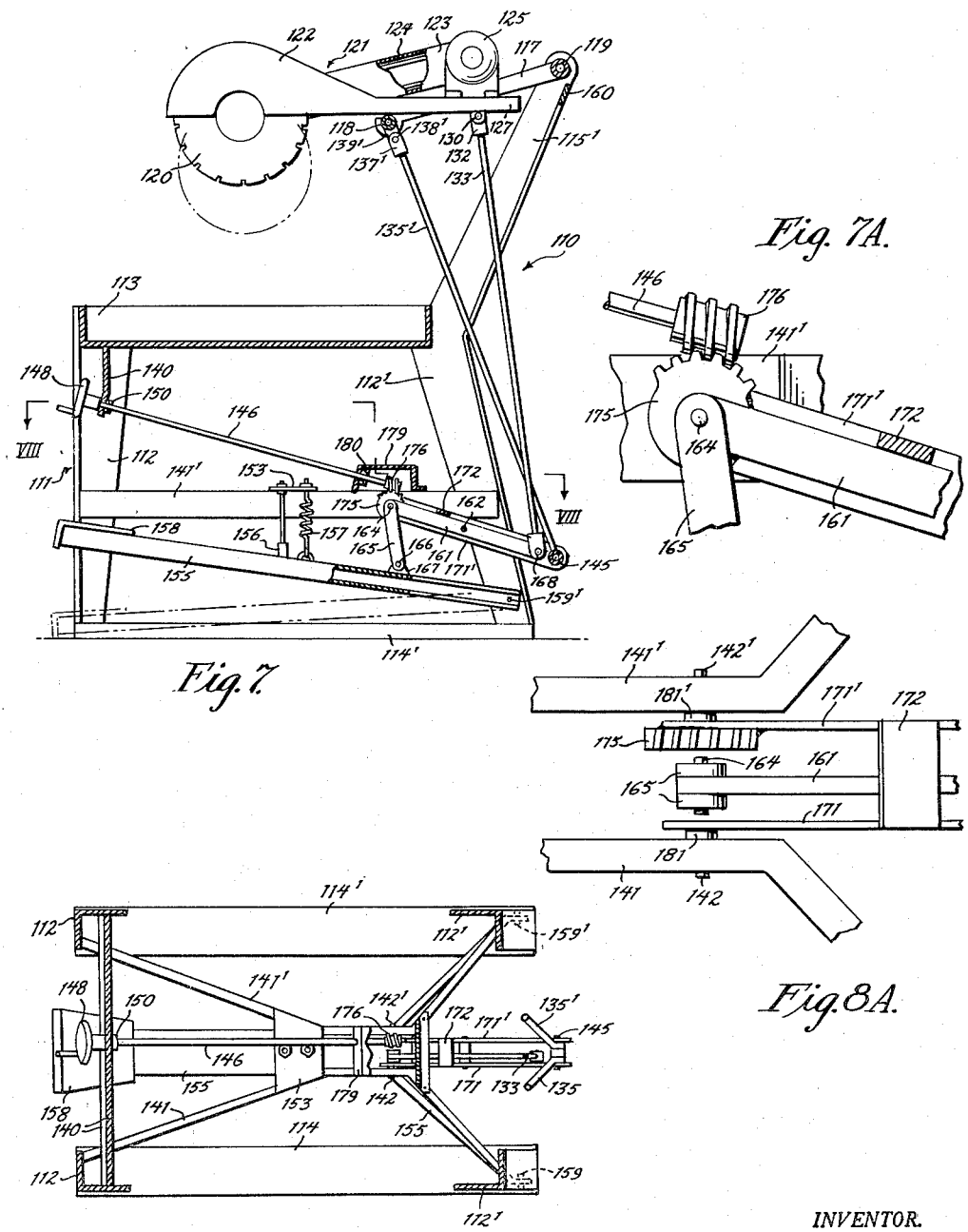

United States Patent Office 3,001,520
Patented Sept. 26, 1961

3,001,520
TILTING SAW
Edward A. Zuzelo, 652 Broad Acres Road., Narberth, Pa.
Filed Aug. 30, 1960, Ser. No. 53,591
10 Claims. (Cl. 125—14)

This invention relates to machines for cutting or otherwise working masonry and similar articles, concerning especially means for adjusting and controlling the height and the angular position or tilt of a cutter assembly or other tool pivotally mounted over a work surface.

This application is a continuation-in-part of application, Serial No. 820,657, filed June 16, 1959, now abandoned.

It is customary to cut brick, concrete, tile, and the like with a rotary saw blade of a cutter assembly pivotally mounted above a work surface on which rests the material to be cut. The saw blade is depressed onto and into the material most conveniently by pivoting the cutter assembly downward, thereby also changing its angle of attack or tilt. Many linkages are known for changing the rest position of the blade above the work surface, as is desirable when changing the size of the article to be cut, but in conventional equipment in which the pivotal mounting is not raised or lowered to raise or lower the entire cutter assembly an undesirably extreme tilt is imparted to the cutter assembly when the height of the blade is adjusted by tilting it to accommodate the different articles. Of course, the entire mounting of the cutter assembly may be raised or lowered bodily without changing the angle, but such arrangements require additional mechanical complication that is both annoying to operate and expensive to acquire and maintain.

A primary object of the present invention is improved height adjustment and tilt control for a pivotally mounted cutter assembly or the like. An object is elimination of undesired degrees of tilt of a cutter assembly having a fixed mounting pivot. A particular object is automatic compensation for or counteraction of tilt imparted to a pivotally mounted cutter assembly upon adjustment of the rest position or height of the saw blade contained in the assembly. Other objects of this invention, together with means and methods for attaining the various objects, will be apparent from the following description and the accompanying diagrams.

Figures 1, 2:
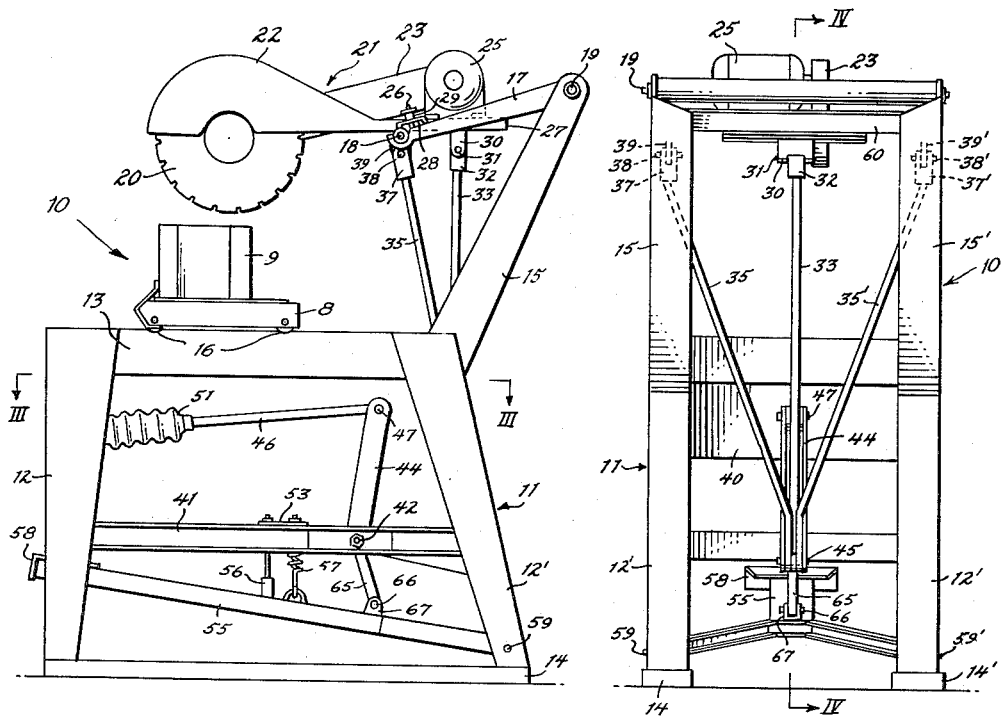
Figure 3:
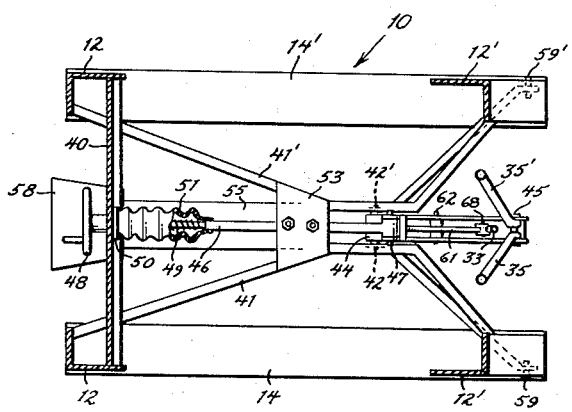

FIG. 1 is a side elevation of a first embodiment of masonry saw constructed according to the present invention; FIG. 2 is a rear elevation of the apparatus of FIG. 1; and FIG. 3 is a sectional plan of the apparatus of the preceding views, taken at III—III of FIG. 1. FIG. 4 is a side sectional elevation of the apparatus of the previous views, taken at IV—IV of FIG. 2, with the solid lines showing a low rest position and with the broken lines showing a corresponding (even lower) cutting position; FIG. 5 is a side sectional elevation of the same apparatus, taken medially and longitudinally thereof as in FIG. 4, but with the solid lines showing a high rest position and with the broken lines showing a corresponding (lower) cutting position; and FIG. 6 is a fragmentary side sectional elevation of part of the apparatus in the cutting position suggested in the preceding view. FIG. 7 is a sectional side elevation (taken similarly to FIG. 4) of a second embodiment of masonry saw according to the present invention; FIG. 7A is an enlarged side elevation (partly in section) of a portion of the apparatus of FIG. 7; FIG. 8 is a sectional plan taken as indicated at VIII—VIII of FIG. 7; and FIG. 8a is an enlarged plan of a portion of the apparatus of FIG. 8.

In general, the objects of the present invention are accomplished, as set forth below, in a machine for sawing masonry, by means of a frame, a pivotally mounted cutter assembly, adjusting means for raising and lowering the cutter assembly on its pivotal mounting, linkage including lever means interconnecting the cutter assembly and the means for raising and lowering the cutter assembly, means for tilting the cutter assembly about its pivotal mounting and including a depressible tilt lever, and linkage including a lever pivotally mounted on the lever means and interconnecting the cutter assembly and the means for tilting the cutter assembly. The invention contemplates particularly mechanism for compensating for the tilt or angular change in orientation of such a pivotally mounted cutter assembly, upon a change in the height of the pivotal mount therefor above a work surface, comprising a pivotal support at fixed height, an arm connected pivotally thereto at one end and pivotally connecting at its opposite end to the pivotal mount for the cutter assembly, lever means supported to swing about a fixed fulcrum and linked at one end to another portion of the mount for the cutter assembly, the lever means being adapted upon swinging movement thereof about the fulcrum to raise and lower the cutter assembly, means for adjustably swinging the lever means about the fulcrum, a tilt lever supported to swing about a separate fixed fulcrum, the tilt lever being linked to the cutter assembly at a location other than at the location of the pivotal mount by linkage operatively connected to the tilt lever and including a member pivotally supported by the lever means, whereby swinging adjustment of the lever means is adapted to be transmitted through the linkage to the cutter assembly to pivot the cutter assembly in a direction counter to the direction in which it is pivoted by virtue of the same swinging adjustment of the lever means transmitted to the mount for the cutter assembly. The invention also comprehends additional structural features hereinafter identified.

FIG. 1 shows masonry saw 10 having saw frame 11 having pair of vertical front legs 12 and inclined rear legs 12' (only one of each being visible in this view) with pan 13 at the top and pair of skids 14, 14' (only one visible) at the bottom of the legs. Concrete block 9 rests on work cart 8, which is movably mounted on wheels 16 at the top edge of the frame. Extending upward from the top right (rear) corner of the frame is pair of standards 15, 15' (one visible here) carrying pivot pin 19 at the top. Pivotally mounted on pin 19 is pair of arms 17, 17' (one visible) at the other end of which is pivot pin 18. Pivotally mounted on pin 18 is cutter assembly 21. Unless otherwise indicated, primed reference numerals indicate the element (in a pair of like elements) located at the left side of the apparatus as viewed by an operator standing at (facing) the front end, where the height-adjusting handwheel is located.

The cutter assembly comprises principally blade guard or housing 22 surrounding cutter blade 20 at one end of the assembly, motor 25 on platform 27 at or near the other end of the assembly, and belt guard 23 partially enclosing drive belt 24 (see FIG. 4) extending from the motor to the blade. The usual electrical connections to the motor and hydraulic connections for lubricant supplied to the blade are omitted for simplicity of the showing. The cutter assembly rests on pivot pin 18, which it receives in suitable semi-circular hollows or indentations in the bottom of the assembly. The pivot pin rests in corresponding hollows in the end of arms 17, 17' and is secured to each of the arms by bolt 26 extending upward through and above the arm and passing through the bore of inverted U-clamp 28, which rests with its opposite ends against the arm and the pin, respectively, together with nut 29 threaded onto the bolt to retain the clamp in place.

Inverted U-bracket 30 connected to the bottom of the cutter assembly underneath the motor carries pivot pin 31, which holds coupling 32 for depending tilt arm 33.

Movable upright 35 depends from affixed saddle connection 37, by which pivot pin 38 in bored boss 39 on arm 17 holds the end of the upright in place just underneath pin 18. Corresponding members indicated by like reference numerals primed, are hidden in this view. FIG. 2 is a further view of the same apparatus from the rear, providing additional details of the elements already mentioned, including those not visible in FIG. 1, such as transverse member 60 tying the top portions of standards 15, 15' together near pivot pin 19.

Also visible in either or both FIGS. 1 and 2 are elements that appear in plan in FIG. 3, which represents a section taken through the frame just underneath the bottom of the pan. A cross-brace having right and left members 41, 41' extends in the form of an X from the front legs to the rear legs, being attached to the legs approximately midway of their vertical extent. Approximately midway of the brace, where the respective members are closest together and near cross-piece 53, which affixes them to one another, they carry pivot pins 42, 42' (not visible) supporting the right and left edges of lever means comprising generally bifurcated crank 44 at its angular middle portion or apex. Depending from the cross-piece is stop 56, the lower end of which engages foot lever or pedal 55, which has foot plate 58 at its front end and which is bifurcated at its opposite end and there pivotally attached by pins 59, 59' to the rear legs near the bottom thereof. The pedal is biased upward against the stop by extension spring 57 connected from it to the cross-piece more or less parallel to the stop itself.

Height-adjusting means is provided, comprising crank 44 of the designated lever means and associated elements. At the upright portion of the crank (except at the end) the sides are connected channel-like at the front for the sake of rigidity, as is the top of the front one-fourth or so of the front-to-rear extent of the sides just to the rear of the crank fulcrum. The end of the lower arm of the crank near the rear of the frame connects pivotally to the lower ends of uprights 35, 35' by means of pin 45. The top end of the crank nearer the front of the frame carries pivot pin 47, which connects to one end of internally threaded sleeve 46. Mounted at the front of the frame just below the pan on transverse piece 40 connected to the front legs is pillow block 50 for handwheel 48. The handwheel is rotatively mounted in the pillow block and is attached to threaded rod 49, which screws into the sleeve and which is covered by protective bellows 51.

As is apparent in FIG. 3, pivot pin 62 is carried midway of the bifurcated rear portion of the crank. Supported on this pivot pin is short lever 61. The front end of the short lever is connected pivotally to pin 64 at the top end of link 65, whose lower end is connected to the pedal by pin 66, through boss 67. The rear end of the short lever is connected pivotally to the lower end of tilt arm 33 by pin 68. The lever normally rests in substantial alignment with the rearwardly extending portion of the crank between the sides thereof, and departs widely from such alignment only when the foot lever is depressed. See especially the subsequent views.

The operation of the embodiment of apparatus of this invention just described and illustrated is readily understood, especially by reference to FIGS. 4 and 5, which show the previously illustrated apparatus in longitudinal medial vertical section. FIG. 4 shows a low rest position in solid lines and shows in broken lines the corresponding operating position, in which the saw blade at the front end of the cutter assembly is even lower. FIG. 5 shows a high rest position in solid lines and a corresponding lower operating position in broken lines. Thus, the side of a concrete block may be cut as suggested in FIG. 4, and the end of such a block as in FIG. 5.

When the handwheel is in such a position that the attached threaded rod is largely withdrawn from the sleeve, thereby positioning the upper end of the crank toward the rear, as is shown in FIGS. 1 to 4, inclusive, the accompanying lowering of the rear end of the crank lowers the cutter assembly about the fixed pivot by means of the interconnecting uprights. Shown in broken lines in FIGURE 4 is the even lower position of the cutter assembly and associated movable elements, which is attained by depression of the foot plate to bring the saw blade into operating position. Such depression tilts the cutter assembly about the intermediate pivot pin (which although adjustable for height, is fixed in position in this view) by means of the interconnecting linkage, including the short lever pivotally supported on the crank, plus the arm depending from the rear of the cutter assembly and attached to the rear of the short lever. Comparison of this view with the rest and operating positions shown in FIG. 5 is most instructive.

FIG. 5 shows the apparatus with the handwheel rotated to enclose the attached threaded rod within the sleeve, thereby drawing the top end of the crank forward and raising the rear end of the crank. Of course, the increase in height of the rear end of the crank is transmitted to the cutter assembly by means of the uprights, which thereby raise the movable pivot pin located between the ends of the arms. However, if that were the only change the front end of the cutter assembly would be tilted sharply upward, thereby placing the saw blade and the surrounding guard or housing at such an angle of attack that passage of the article to be cut under the blade would be impeded by the housing, which also no longer would protect the operator adequately at the front of the blade. Instead, in the apparatus of this invention, part of the upward thrust of the crank is transmitted to the rear of the cutter assembly through the depending arm, thereby counteracting or largely compensating for such tilt by superimposing a contrary tilt upon it. Similarly to the previous view of the low rest position (FIG. 4) the high rest position appears in solid lines in FIG. 5, while the broken lines indicate the cutting position, to which the saw blade is lowered by depression of the front end of the foot lever, as detailed in FIG. 6.

As an example, an apparatus embodiment of this invention as hereinabove described and illustrated exhibits the following angular variation (referred to the horizontal, the skids resting on a horizontal surface) between the highest and lowest rest position. These extreme settings place the axis of the cutter blade at respective heights of about 28" and 4" above the top horizontal edge of the frame in this particular piece of apparatus.

At high rest position—
Cutter assembly: 12° above; Supporting arms: 14½° above.

At low rest position—
Cutter assembly: 6° below; Supporting arms: 37° below.

Thus, the total change in angle of the cutter assembly from one extreme rest position to the other is less than half (nearer one-third) the change in angle of the supporting arms pivoted on the standards at the rear. The angle of attack with regard to the article to cut remains entirely suitable, the cutter assembly being oriented only slightly above the horizontal in the high rest position and slightly below the horizontal in the low rest position despite a change of about two feet in height of the blade above the frame. Depression of the foot lever lowers the cutter assembly from either rest position through a suitable further angle, such as 15° to 20°, corresponding to about half a foot change in height of the blade, so as to engage the article to be cut. If desired, short lever 61 can be made longer relative to the supporting lower arm of the crank so as to increase the degree of tilt compensation effected upon adjustment of the height of the cutter assembly.

The second embodiment of this invention, masonry saw 110 illustrated in FIGS. 7 to 8A, differs from the first (saw 10 previously shown and described) in the design of the means for adjusting the cutter assembly bodily to greater or lesser height above the article to be cut. In all other respects it is like the apparatus of FIGS. 1 to 6, and the corresponding elements of it are denoted by reference numerals greater by one hundred than the numerals applied to the corresponding parts of the first saw (the corresponding elements or parts being in many instances identical or substantially so, they are not necessarily mentioned specifically in the following description). As in FIG. 4, a depressed or operating position of the saw blade and of the foot lever, depression of which tilts the cutter assembly to lower the blade, appears in FIG. 7.

FIG. 7 is a sectional elevation taken longitudinally along substantially the medial plane of saw 110 in like manner as FIG. 4 was taken of preceding saw 10, at a low rest position. No bell crank is employed, but pin 145 at the lower end of bifurcated uprights 135, 135' supports the rear end of lever means comprising matching pair of right and left lever members 171, 171' bridged intermediate their ends by reinforcing piece 172. The front end of the lever means is pivoted at fixed height on the frame about a fulcrum provided by right and left pins 142, 142' through supporting cross-brace members 141, 141' and respective lever members 171, 171'. Pivoted on the lever means by pin 162 intermediate the ends of the component lever members is somewhat shorter lever 161, which pivotally interconnects vertically extending tilt arm 133 and foot lever 155 by means of respective pivot pins 168 and 164; link 165, retained at its lower end by pin 166 through boss 167 on the foot lever, is held at its upper end by pin 164 to lever 161. Left lever member 171' has affixed to the front end (upper end, FIGS. 7 and 7A), concentric with pin 142', worm gear or wheel segment 175. In mesh with that gear segment is worm 176 affixed to the end of shaft 146, which connects to hand wheel 148; the shaft is journalled in pillow block 150 affixed to the oblique lower end of transverse piece 140, which interconnects front legs 112. The shaft inclines from front to rear and is journalled near its rear end by bearing 180 affixed to the inside wall of housing 179, which covers the worm and meshing gear segment. These elements (excluding the housing) and associated elements in the vicinity thereof, as viewed from the right side, appear enlarged in FIG. 7A.

FIG. 8, which resembles FIG. 3 of the previous views, shows the apparatus of FIG. 7 sectioned below the pan as indicated at VIII—VIII of FIG. 7. The section is taken through the wall of housing 179, only portions of which remain in this view. Details of the nearby elements (excluding the housing) appear enlarged in FIG. 8A. This enlarged plan view shows clearly the relative locations of the right and left lever members of the lever means pivoted on the cross-brace members of the frame and spaced therefrom by intervening right and left bushings 181, 181'. From these views it is apparent that lever 161, which is pivotally supported by the lever means, is off-set slightly nearer the right lever member, inasmuch as gear segment 175 is affixed to the inner wall of the left lever member. Link 165 to the foot lever, which is shown in clevis shape at its top end, is spaced between the right lever member and the gear segment affixed to the left member.

The manner of adjustment of the height of the cutter assembly in the embodiment just described and illustrated is readily apparent. Clockwise rotation of the hand wheel at the front of the frame rotates the wheel and thereby rotates the meshing worm and gear segment and raises the opposite end of the attached lever means about the axis of the gear segment, thereby raising the cutter assembly bodily to a higher rest position. Of course, counter-clockwise rotation of the hand wheel lowers the cutter assembly in like manner. It will be understood that the illustrated gearing is not necessarily shown to scale and that the pitch and dimensions thereof will be selected to provide the desired degree of mechanical advantage so as to facilitate height adjustment of the cutter assembly by manual rotation of the hand wheel.

Noteworthy as a feature of the construction of the second embodiment of the present invention is the relationship between the relative lengths and orientations of matched pair of lever members 171, 171' and of junction arms 117, 117', the latter of which join frame standards 115, 115' with movable pivot 118 of cutter assembly 121. As shown in FIG. 7, these respective pairs of members (located near the top and the bottom of the apparatus, respectively) are of equal length and are oriented at equal but opposite angles to the horizontal; this ensures bodily movement of the cutter assembly corresponding exactly to the movement of the pivot pin joining the lever means to uprights 135, 135'. As lever 161, which is suspended by the lever members comprising the aforementioned lever means and which interconnects the foot lever and tilt arm to tilt the cutter assembly, is coincident (when the foot lever is at any rest position, i.e., not depressed) at one end with the fixed pivot of the height-adjusting lever means, the tilt imparted upon adjustment of the lever means to change the height of the cutter assembly nearly completely counteracts the tilt that would be imparted to it if the tilt arm remained fixed in position.

Thus, the customary tilting upward of the blade end of such a cutter assembly upon an increase in height of the assembly as a whole, is largely eliminated. Substantially complete tilt compensation, if desired, can be achieved by lengthening the interconnecting lever pivotally supported on the lever means until the pivots at both of the ends, instead of at only one end, as shown, are aligned (in any tilt position) with the pivots of the component lever members thereof. Apparatus constructed according to this second embodiment of the invention and of size comparable to that for which data are given above for the first embodiment, is capable of reducing the angular variation in the tilt of the cutter assembly at corresponding extreme raised positions to about half or less of the range indicated there, upon occurrence of a like total change in angle of the junction arms. In this respect, the second embodiment is preferable to the first, although by judicious modification of the dimensions and angular orientation of corresponding elements therein, similarly improved results could be obtained there, as well. Regardless of what embodiment of this invention is employed, its use is quite beneficial.

The advantage to the operator of increased range of height of the saw blade above the work surface (consequently increasing the dimensional range of the articles readily cut by the blade), as well as increased safety and ease of adjustment of the blade height, is obvious. As is customary, a spring or other resilient means may be interposed in the mounting of the cutter assembly or in the linkage for tilting it, with the object of permitting the blade to rise slightly instead of jamming and possibly breaking when encountering an especially hard portion of (or contaminant in) an article being cut. It will be apparent that the linkage for adjusting the blade height and control of the tilt of the cutter assembly can be varied and that various of the parts may be combined or divided without departing from the claimed inventive concept. The full benefit of the invention will become apparent to those undertaking to practice it in the light of the above teaching.

The claimed invention is:

1. Mechanism for compensating for angular change in orientation of a pivotally mounted cutter assembly upon a change in the height of the pivotal mount therefor above a work surface, comprising a pivotal support at fixed height, an arm connected pivotally thereto at one end and pivotally connecting at its opposite end to the pivotal mount for the cutter assembly, lever means supported to swing about a fixed fulcrum and linked at one end to another portion of the mount for the cutter assembly, the lever means being adapted upon swinging movement thereof about the fulcrum to raise and lower the cutter assembly, means for adjustably swinging the lever means about the fulcrum, a tilt lever supported to swing about a separate fixed fulcrum, the tilt lever being linked to the cutter assembly at a location other than at the location of the pivotal mount by linkage operatively connected to the tilt lever and including a member pivotally supported by the lever means, whereby swinging adjustment of the lever means is adapted to be transmitted through the linkage to the cutter assembly to pivot the cutter assembly in a direction counter to the direction in which it is pivoted by virtue of the same swinging adjustment of the lever means transmitted to the mount for the cutter assembly.

2. In a cutting machine, a frame, a work surface mounted on the frame, a standard extending upwardly from the frame and above the level of the work surface, a substantially vertically reciprocable upright member having a support affixed to the upper end thereof, linkage pivotally connecting the support to the standard, a cutter assembly, means pivotally mounting the assembly on the support, lever means pivotally mounted adjustably about a fulcrum on the frame, means interconnecting the lever means with the lower end of the upright member, a separate lever pivotally carried by the lever means intermediate the fulcrum and the connection of the lever means to the upright member, a tilt lever pivotally attached to the frame, means pivotally interconnecting the tilt lever with one end of the separate lever, and an arm interconnecting the other end of the separate lever with the cutter assembly.

3. A machine for sawing masonry, comprising a frame including a fixed standard extending above the rest of the frame, a pair of arms pivotally attached to the upper part of the standard and extending over a portion of the rest of the frame, substantially horizontal pivot means carried by the arms, a saw platform mounted on the pivot means for pivoting through a limited arc in a substantially vertical plane, a cutter assembly mounted at one end of the platform, lever means adjustably supported about a fulcrum on the frame, an upright member interconnecting one end of the lever means with the arms, a pivot pin carried by the lever means between the fulcrum and the connection of the lever means to the upright member, a short lever pivotally mounted intermediate its ends on the pivot pin, a rod pivotally interconnecting the end of the cutter platform at the opposite side of the pivot means from the cutter assembly with the end of the short lever located nearer to the connection of the lever means with the upright member than to the fulcrum of the lever means, a long lever pivotally mounted on the frame, a link pivotally interconnecting the long lever with the end of the short lever located nearer to the fulcrum of the lever means than to the connection of the lever means with the upright member, and a stop attached to the frame and located to limit the travel of the long lever.

4. Masonry saw comprising a frame adapted to carry a work-supporting surface and having a pair of standards extending upwardly from the rear thereof, a pivot pin supported thereby and supporting a pair of arms for arcuate movement parallel to a plane intersecting the work-supporting surface, a cutter assembly pivotally carried on the pair of arms and including a saw blade adapted to intersect the work-supporting surface upon arcuate movement of the pair of arms about their fixed pivot, a pair of uprights pivotally connected to the pair of arms, lever means carried pivotally by the frame for limited arcuate movement in such plane and pivotally connected to the pair of uprights, a tilt arm pivotally connected to the cutter assembly at a location spaced from the arcuately movable pivotal axis thereof, a foot lever pivotally carried by the frame for limited arcuate movement in such plane and pivotally connected to the tilt arm, with the pair of uprights crossing nearer to the location of the work-supporting surface than to either of their ends when viewed perpendicular to such plane.

5. Machine for sawing masonry, comprising a supporting frame, a cutter assembly including a rotary blade, a pivotal mount for the cutter assembly, means linking the mount for the cutter assembly pivotally to the frame for pivotal adjustment with respect thereto in an arc substantially parallel to the plane of the blade, adjusting means supported by the frame and adapted to effect such pivotal adjustment of the mount for the cutter assembly, linkage interconnecting the adjusting means and the mount for the cutter assembly and including lever means pivotal about a fixed fulcrum on the frame through an arc substantially parallel to the plane of the blade, a depressible tilt lever pivotal about a fixed fulcrum on the frame through an arc substantially parallel to the plane of the blade, linkage interconnecting the tilt lever to the cutter assembly and including a lever pivotally mounted on the lever means.

6. The apparatus of claim 5 wherein the lever means of the adjusting means has the configuration of a bell crank fulcrumed pivotally at its apex on the frame, and the adjusting means includes an upright, pivotally connected to the mount for the cutter assembly and to one arm of the crank, and mechanism supported on the frame and pivotally connected to the other arm of the crank, the mechanism being adapted to lengthen and shorten and thereby to adjust the position of the crank about the apex or fulcrum.

7. The apparatus of claim 5 wherein the lever means of the adjusting means has the configuration of an arm and has a gear segment affixed to one end pivotally on the frame, and the adjusting means includes an upright, pivotally connected to the mount for the cutter assembly and to the other end of the arm, and mechanism including a worm in mesh with the gear segment, the mechanism being adapted to rotate the worm and thereby to adjust the position of the arm about the gear-segment pivot or fulcrum.

8. Machine for sawing masonry, comprising a supporting frame, a cutter assembly mounted adjustably in height, with respect to the frame, on movable pivot means; height-adjusting means including a junction arm, of which opposite ends join the movable pivot means pivotally to pivot means located at fixed height with respect to the frame, thereby adapting the cutter assembly to be pivotally adjustable at a relatively long radius about the fixed pivot means, lever means located below the junction arm and pivotable about a fixed fulcrum on the frame, and an upright pivotally interconnecting the movable pivot means and the opposite end of the lever means; tilt-controlling means including a tilt arm pivotally connected to the cutter assembly, at a distance corresponding to a relatively short radius from the movable pivot means therefor, and a depressible lever pivotable on the frame and linked to the tilt arm; and linkage interconnecting the height-adjusting means to the tilt-controlling means and including a pivot carried intermediate the ends of the lever means pivotable about the fixed fulcrum, and a lever pivotally mounted on that pivot, the lever being interconnected to the tilt arm and the depressible lever by means of interconnecting linkage therefor.

9. The apparatus of claim 8 wherein the junction arm and the lever means are of equal length and are oriented, at any height of the cutter assembly, at equal but opposite angles to the horizontal.

10. The apparatus of claim 9 wherein the lever pivotally mounted intermediate the ends of the lever means is adapted to pivot to bring its ends into substantial alignment therewith.

References Cited in the file of this patent

UNITED STATES PATENTS 2,893,372   Harclerode  _____ July 7, 1959